US008165975B2

(12) United States Patent
Aggarwal

(10) Patent No.: US 8,165,975 B2
(45) Date of Patent: Apr. 24, 2012

(54) METHODS AND APPARATUS FOR MONITORING ABNORMALITIES IN DATA STREAM

(75) Inventor: Charu C. Aggarwal, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 12/507,876

(22) Filed: Jul. 23, 2009

(65) Prior Publication Data

US 2009/0292979 A1    Nov. 26, 2009

Related U.S. Application Data

(63) Continuation of application No. 10/943,329, filed on Sep. 17, 2004, now abandoned.

(51) Int. Cl.
G06F 15/18    (2006.01)
(52) U.S. Cl. ............................................. 706/12
(58) Field of Classification Search .................... 706/12
See application file for complete search history.

(56) References Cited

OTHER PUBLICATIONS

Liu et al ("step by step regression: a more efficient alternative for polynomial multiple linear regression in stream cube" PAKDD Apr. 30-May 2, 2003).*
"The authoritative dictionary of IEEE standards terms" seventh edition, 2000, 2 pgs.*
Noel et al ("Network-Based Anomaly Detection Using Discriminant Analysis" Journal of Information Warfare, vol. 1, No. 2, Dec. 2001, pp. 12-22).*
J. Feigenbaum et al., "Testing and Spot-Checking of Data Streams," ACM SODA Conference, Mar. 2000, pp. 1-14.
J. Fong et al., "An Approximate Lp-Difference Algorithm for Massive Data Streams," Discrete Mathematics and Theoretical Computer Science, Mar. 2001, pp. 301-322.
C. Cortes et al., "Hancock: A Language for Extracting Signatures from Data Streams," ACM SIGKDD Conference, Aug. 2000, 9 pages.
S. Guha et al., "Clustering Data Streams," IEEE FOCS Conference, Nov. 2000, pp. 1-8.
B-K. Yi et al., "Online Data Mining for Co-Evolving Time Sequences," ICDE Conference, 2000, 10 pages.
C.C. Aggarwal et al., "A Framework for Clustering Evolving Data Streams," Proceedings of the 29th VLDB Conference, 2003, 12 pages, Germany.
P. Domingos et al., "Mining High-Speed Data Streams," ACM SIGKDD Conference, Aug. 2000, 10 pages.
M. Berndtsson et al., "Issue in Active Real-Time Databases," Active and Real-Time Databases, 1995, 16 pages.
T. Lane et al., "An Application of Machine Learning to Anomaly Detection," Proceedings of the 20th National Information Systems Security Conference, Feb. 1997, 13 pages.
W. Lee et al., "Learning Patterns from Unix Process Execution Traces for Intrusion Detection," AAAI Workshop: AI Approaches to Fraud Detection and Risk Management, Feb. 1997, 7 pages.

(Continued)

Primary Examiner — Jeffrey A Gaffin
Assistant Examiner — Lut Wong
(74) Attorney, Agent, or Firm — William Stock; Ryan, Mason & Lewis, LLP

(57) ABSTRACT

A technique for monitoring a primary data stream comprising a plurality of secondary data streams for abnormalities is provided. A deviation value for each of two or more of the plurality of secondary data streams is determined. The two or more deviation values of the two or more secondary data streams are combined to form a combined deviation value. An abnormality signal is generated based at least in part on the combined deviation value.

19 Claims, 3 Drawing Sheets

OTHER PUBLICATIONS

H. Branding et al., "Rules in an Open System: The REACH Rule System," First Workshop of Rules in Database Systems (RIDS), 1993, pp. 111-126.

C. Liu et al., "Step-by-Step Regression: A More Efficient Alternative for Polynomial Multiple Linear Regression in Stream Cube," PAKDD, 2003, pp. 437-448.

R.K. Abbott et al., "Scheduling Real-Time Transactions with Disk Resident Data," Proceedings of the Fifteenth International Conference on Very Large Data Bases (VLDB), Aug. 1989, pp. 385-396, Amsterdam.

D. Bonachea et al., "Hancock: A Language for Processing Very Large-Scale Data," 2nd USENIX Conference on Domain-Specific Languages (DSL), Oct. 1999, 14 pages.

V. Ganti et al., "Mining Data Streams Under Block Evolution," ACM SIGKDD Explorations, Jan. 2002, pp. 1-10, vol. 3, No. 2.

J. Gehrke et al., "On Computing Correlated Aggregates Over Continual Data Streams," ACM SIGMOD, May 2001, 12 pages.

W.J. Labio et al., "Efficient Snapshot Differential Algorithms for Data Warehousing," Proceedings of the 22nd VLDB, Sep. 1996, pp. 63-74, India.

* cited by examiner

METHODS AND APPARATUS FOR MONITORING ABNORMALITIES IN DATA STREAM

CROSS-REFERENCE TO RELATED APPLICATION(S)

This application is a continuation of pending U.S. application Ser. No. 10/943,329, filed on Sep. 17, 2004, the disclosure of which is incorporated by reference herein.

STATEMENT OF GOVERNMENT RIGHTS

This invention was made with government support under Contract No.: H98230-04-3-0001 awarded by the Distillery Phase II Program. The government has certain rights in this invention.

FIELD OF THE INVENTION

The present invention is related to techniques for monitoring abnormalities in a data stream and, more particularly, for detecting rare abnormalities in a data stream having similar but spurious patterns of abnormality.

BACKGROUND OF THE INVENTION

In recent years, advances in hardware technology have made it possible to collect large amounts of data in many applications. Typically, a database processing this data is affected by continuous activity over long periods of time, thereby allowing such a database to grow without limit. Examples of such data include supermarket data, multimedia data and telecommunication applications. The volume of data may easily reach millions on a daily basis, and it is often not possible to store it so that standard algorithmic techniques may be applied. Therefore, algorithms designed for such data must take into account the fact that it is not possible to revisit any part of the voluminous data, and that only a single scan of the data is allowed during processing. Data of this type is commonly referred to as a data stream.

Unlike a traditional data source, a stream is a continuous process which requires simultaneous model construction and abnormality reporting. Therefore, it is necessary for a supervision process to work with whatever information is currently available, and to continually update an abnormality detection model as new abnormalities occur.

Considerable research has been conducted in the field of data streams in recent years, see, for example, J. Feigenbaum et al., "Testing and Spot-Checking of Data Streams," ACM SODA Conference, 2000; J. Fong et al., "An Approximate $L^p$-Difference Algorithm for Massive Data Streams," Annual Symposium on Theoretical Aspects in Computer Science, 2000; C. Cortes et al., "Hancock: A Language for Extracting Signatures from Data Streams," ACM SIGKDD Conference, 2000; S. Guha et al., "Clustering Data Streams," IEEE FOCS Conference, 2000; and B-K. Yi et al., "Online Data Mining for Co-Evolving Time Sequences," ICDE Conference, 2000.

Many traditional data mining problems, such as clustering and classification, have recently been re-examined in the context of the data stream environment, see, for example, C. C. Aggarwal et al., "A Framework for Clustering Evolving Data Streams," VLDB Conference, 2003; P. Domingos et al., "Mining High-Speed Data Streams," ACM SIGKDD Conference, 2000; and S. Guha et al., "Clustering Data Streams," IEEE FOCS Conference, 2000.

Abnormality detection is an important problem in the data mining community, see, for example, H. Branding et al., "Rules in an Open System: The Reach Rule System," First Workshop of Rules in Database Systems, 1993; M. Berndtsson et al., "Issues in Active Real-Time Databases," Active and Real-Time Databases, pp. 142-157, 1995; T. Lane et al., "An Application of Machine Learning to Anomaly Detection," Proceedings of the 20th National Information Systems Security Conference, pp. 366-380, 1997; and W. Lee et al., "Learning Patterns from Unix Process Execution Traces for Intrusion Detection," AAAI Workshop: AI Approaches to Fraud Detection and Risk Management, pp. 50-56, July 1997. However, these models do not address the prediction of rare abnormalities in the presence of many spurious, but similar, patterns.

For example, in stock market monitoring applications, it may be desirable to find patterns in trading activity which are indicative of a possible stock market crash. The stream of data available may correspond to the real time data available on the exchange. While a stock sell-off may be a relatively frequent occurrence, which has similar effects on the data stream, one may wish to have the ability to quickly distinguish the rare crash from a simple sell-off. It may also be desirable to detect particular patterns of trading activity which result in the sell-off of a particular stock, or a particular sector of stocks. A quick detection of such abnormalities is of great value to financial institutions.

In business activity monitoring applications, it may be desirable to find particular aspects of the stream indicative of significant abnormalities in business activity. For example, certain sets of actions of competitor companies may point to the probable occurrence of significant abnormalities in the business. When such abnormalities do occur, it is important to be able to detect them very quickly, so that appropriate measures may be taken.

In medical applications, continuous streams of data from hospitals or pharmacies can be used to detect any abnormal disease outbreaks or biological attacks. Certain diseases caused by biological attacks are often difficult to distinguish from other background diseases. However, it is essential to be able to make such distinguishing judgments in real time in order to create a credible abnormality detection system.

Abnormalities such as disease outbreaks or stock market crashes may occur rarely over long periods of time. However, the value of abnormality detection is highly dependent on the latency of the detection. Most abnormality detection systems are usually coupled with time-critical response mechanisms. Furthermore, because of efficiency considerations, it is possible to examine a data point only once throughout the entire computation. This creates an additional constraint on how abnormality detection algorithms may be designed.

In most situations, data streams may show abnormal behavior for a wide variety of reasons. It is important for an abnormality detection model to be specific in its ability to focus and learn a rare abnormality of a particular type. Furthermore, spurious abnormalities may be significantly more frequent than the rare abnormalities of interest. Such a situation makes the abnormality detection problem even more difficult, since it increases the probability of a false detection.

In many cases, even though multiple kinds of anomalous abnormalities may have similar effects on the individual dimensions, the relevant abnormality of interest may only be distinguished by its relative effect on these dimensions. Therefore, an abnormality detection model needs to be able to quantify such differences.

Since a data stream is likely to change over time, not all features remain equally important for the abnormality detection process. While some features may be more valuable to the detection of an abnormality in a given time period, this characteristic may vary with time. It is important to be able to modify the abnormality detection model appropriately with the evolution of the data stream.

SUMMARY OF THE INVENTION

The present invention provides techniques for monitoring abnormalities in a data stream and, more particularly, for detecting rare abnormalities in a data stream through an algorithm which can handle the aforementioned complexities. Furthermore, the methodologies of the present invention do not require any re-scanning of the data, and are therefore useful for a very fast data stream.

In one aspect of the present invention, a technique for monitoring a primary data stream, comprising a plurality of secondary data streams, for abnormalities is provided. A deviation value for each of two or more of the plurality of secondary data streams is determined. The two or more deviation values of the two or more secondary data streams are combined to form a combined deviation value. An abnormality signal is generated based at least in part on the combined deviation value.

A supervised approach is utilized in which the abnormality detection process learns from the data stream. A considerable level of specificity may be achieved by using the behavior of the combination of multiple secondary data streams which are able to distinguish between different kinds of seemingly similar abnormalities.

A supervised abnormality detection problem is very different from a data stream classification problem in which each record has a label attached to it. In a supervised abnormality detection problem, individual records are unlabelled, and the abnormalities of importance are attached only to particular moments in time. Since individual records do not have class labels, the training of the abnormality detection process is more constrained by the limited available information. Furthermore, the rarity of the abnormality adds an additional level of complexity to the detection process.

The methodologies of the present invention provide an effective method for detecting rare abnormalities in a fast data stream. Since a data stream may contain many different kinds of abnormalities, it is necessary to be able to distinguish their characteristic behavior. Therefore, the methodology is able to distinguish particular kinds of abnormalities by learning subtle differences in how different streams are affected by different abnormalities. The methodology performs statistical analysis on multiple dimensions of the data stream in order to perform the detection. Since the technique is tailored for fast responses to continuous monitoring of processes, the entire framework of the methodology is constructed to facilitate online abnormality monitoring of data streams. Therefore, the process can detect the abnormalities with any amount of historical data, but the accuracy is likely to improve with progression of the data stream, or as more data is received.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform efficient and effective data stream abnormality detection.

As will be illustrated in detail below, the present invention introduces techniques for monitoring abnormalities in a data stream and, more particularly, for detecting rare abnormalities in a data stream having similar but spurious patterns of abnormality.

Figure 1:
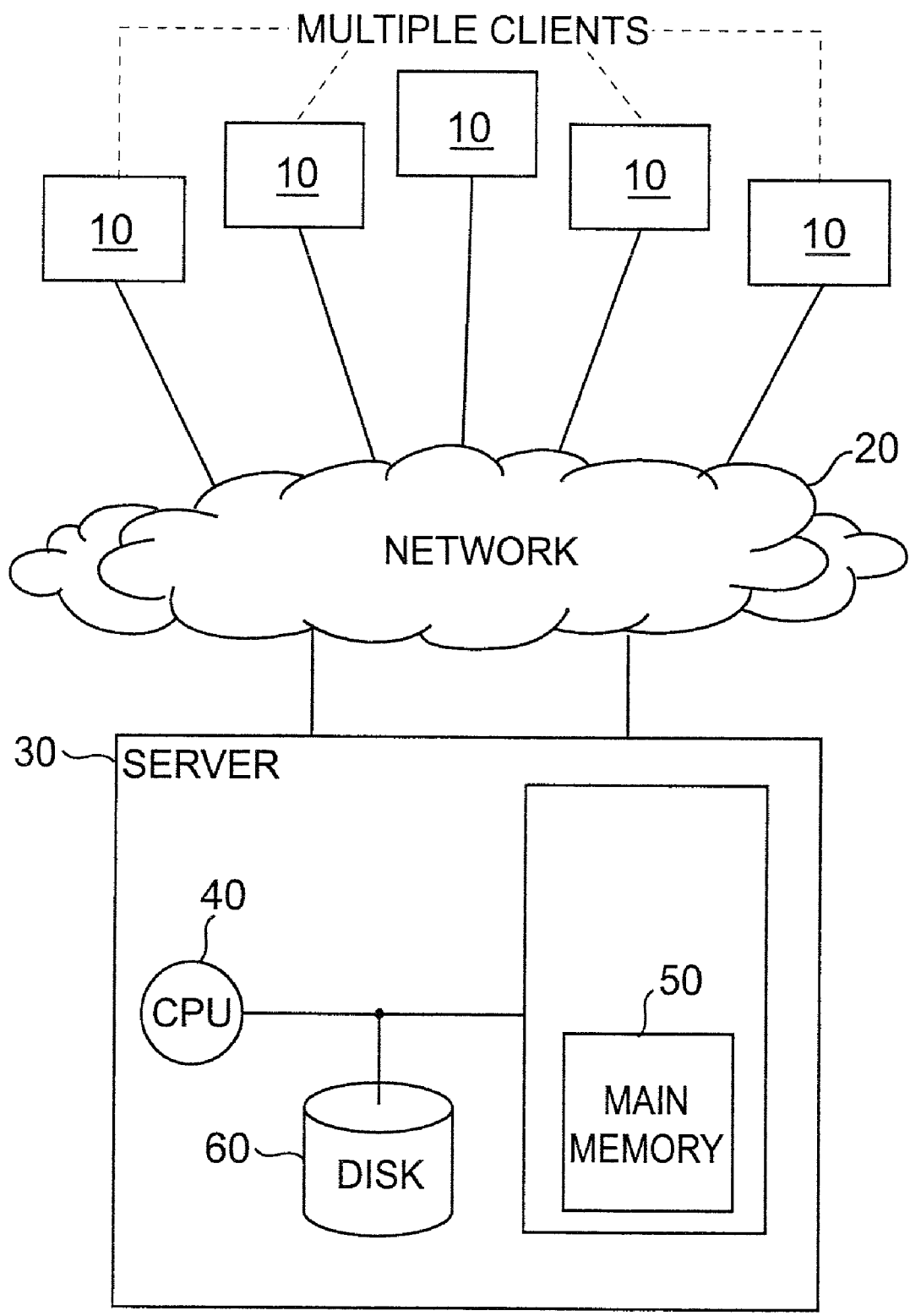
FIG. 1 is a block diagram illustrating a hardware implementation suitable for employing methodologies, according to an embodiment of the present invention.

Referring initially to FIG. 1, a block diagram illustrates a hardware implementation suitable for employing methodologies, according to an embodiment of the present invention. As illustrated, an exemplary system comprises multiple client devices 10 coupled via a large network 20 to a server 30. Server 30 may comprise a central processing unit (CPU) 40 coupled to a main memory 50 and a disk 60. Multiple clients 10 can interact with server 30 over large network 20. It is to be appreciated that network 20 may be a public information network such as, for example, the Internet or World Wide Web, however, clients 10 and server 20 may alternatively be connected via a private network, a local area network, or some other suitable network.

Records from a data stream are received at server 30 from an individual client 10 and stored on disk 60. All computations on the data stream are performed by CPU 40. The corresponding statistical data are stored on disk 60, and are utilized for detection purposes.

A primary data stream may be realized from one or more channels. Essentially, data from different channels are derived from different sources, which contain different kinds of information relevant to the abnormality. Each channel may consist of one or more secondary multidimensional data streams. The secondary data streams are fused together to form the complete primary data stream. For example, for an abnormality detection algorithm in a biological environment, the secondary data streams may consist of a stream for hospital admissions with demographic information, a stream for pharmacy sales, and a steam for attendance records.

Points in time at which the behavior of the primary data stream is monitored are referred to as ticks. The time stamps associated with the ticks are denoted by $t(1), t(2), \ldots t(k)$. The ticks and time stamps are distinguished because the behavior of the data stream may not necessarily be monitored at equal intervals of time. It is assumed that the data points arrive only at one of these ticks or time stamps.

The total number of secondary data streams is N, and the set of data points associated with the ith stream at tick k is denoted by $Y_{i(k)}$. The data points in the stream $Y_{i(k)}$ are denoted by $y_{i(1)}, y_{i(2)}, \ldots y_{i(k)}$. It is assumed that for each stream i, the data point $y_{i(j)}$ arrives at the time stamp t(j). The entire feed of N streams at tick k is therefore denoted by $Y(k) = \{Y_{1(k)} \ldots Y_{N(k)}\}$.

It is assumed that the time stamps at which the rare abnormalities occur in the primary data stream are denoted by T(1) ... T(r). These abnormalities may either be the primary abnormalities that are desired to be detected, or they may be spurious, or secondary, abnormalities in the data stream. For each abnormality k at time T(k), a flag(k) is maintained. When this abnormality is a primary abnormality, flag(k) is 1. In addition, Q(k) is also maintained, which is the time stamp of the last reported occurrence of any abnormality.

The value of Q(k) is typically larger than the true time of abnormality occurrence T(k), since the value of Q(k) refers to the abnormality report time, whereas the value of T(k) refers to the occurrence time. The last report time is typically larger than the time of the actual abnormality itself, since the external sources reporting the abnormality would need a lag to verify it. These external sources may use a variety of domain specific methods or simply personal observation to decide on the final verification of abnormality occurrence.

It is assumed that the report of an abnormality is an external input to the algorithm, and is available only after a reasonable lag after the actual occurrence of the abnormality. Clearly, a detection algorithm is useful only if it can report abnormalities before they are independently reported and verified by external sources. Assuming that k(r) abnormalities have occurred till tick r, the sequence $\{(Q(1), T(1), flag(1)) \ldots (Q(k(r)), T(k(r)), flag(k(r)))\}$ until tick r is denoted by the abnormality vector E(r). The length of this sequence depends upon the number of abnormalities which have transpired till tick r.

The abnormality detection algorithm outputs a set of time stamps $T^{*(1)} \ldots T^{*(n)}$ at which it has predicted the detection. A particular detection $T^{*(i)}$ is referred to as a true detection, when for some lag threshold maxlag, some time stamp T(j) exists, such that $0 \leq T^{*(i)} - T(j) \leq maxlag$. Otherwise, the detection is referred to as a false positive. There is a tradeoff between being able to make a larger number of true detections and the number of false alarms. If the algorithm outputs a larger number of detection time stamps in order to reduce the latency, it is likely to report a greater number of false positives and vice-versa.

The supervised abnormality detection algorithm continuously detects abnormalities utilizing the data from the history of previous abnormality occurrences. In addition, a learning phase is triggered once after every reported occurrence of a primary or secondary abnormality in order to update the model. The reporting of an abnormality is an independent external process and is not dependent upon the actual detection of an abnormality by the algorithm. In most practical applications, abnormalities are eventually detected and reported because of a variety of factors such as the actual practical consequences of the abnormality. These report times are often too late to be of practical use for abnormality responses. However, they can always be used to improve the accuracy of the abnormality detection model when required.

Figure 2:
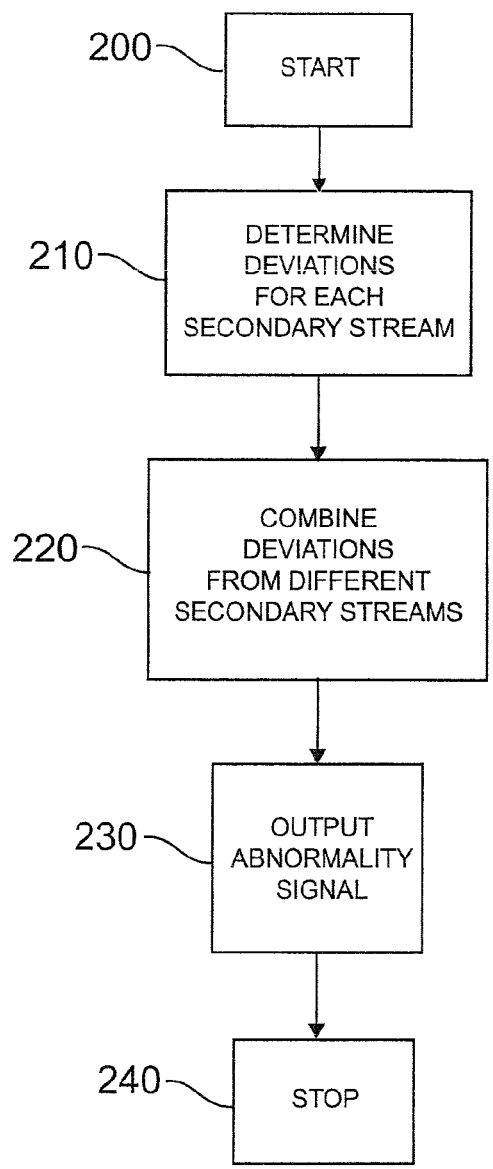
FIG. 2 is a flow diagram illustrating an abnormality signal generation methodology, according to an embodiment of the present invention.

Referring now to FIG. 2, a flow diagram illustrates an abnormality signal generation methodology, according to an embodiment of the present invention. The methodology begins at block 200 where the model is initialized at the beginning of the detection process. The abnormality detection phase is performed at each tick.

It is assumed that at the beginning of the stream monitoring process, some amount of historical data is available in order to construct an initial model of abnormality behavior. This historical data consists of the stream and the abnormalities in the past time window at the beginning of the abnormality monitoring process. The initial stream is denoted by $Y_h$, and the initial set of abnormalities is denoted by $E_h$. Once the abnormality detector has been initialized, the methodology continues in an iterative phase of continuous online monitoring together with occasional offline updating.

In block 210, abnormal statistical deviations for secondary data streams are computed at a given instant. These statistical deviations are from expected values based on historical trends, which is described in more detail in FIG. 3. In block 220, the deviations of the secondary data streams are combined in accordance with statistical weights of the channels, which is described in more detail in FIG. 4. In block 230, an abnormality signal for the data stream is output. The methodology terminates at block 240.

Figure 3:
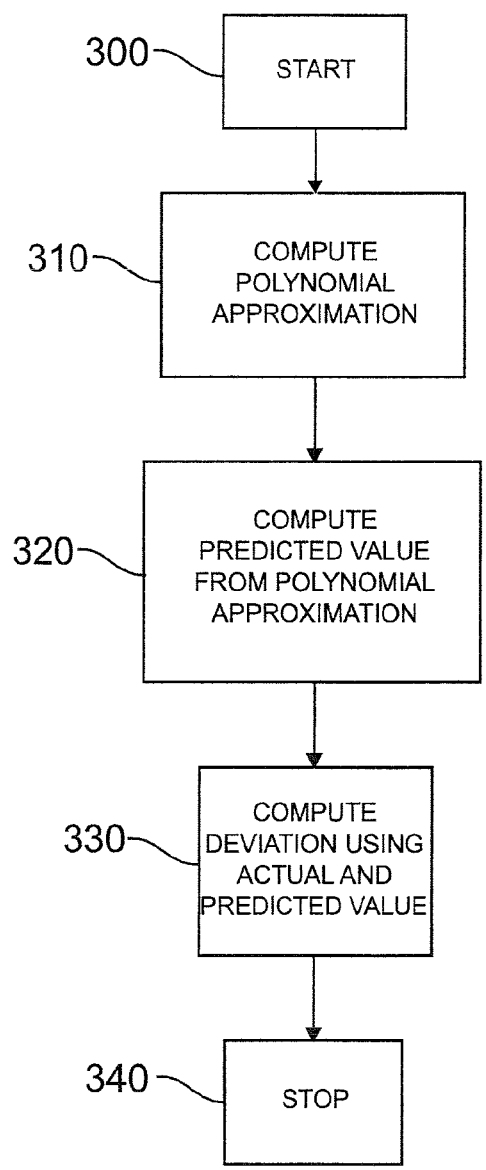
FIG. 3 is a flow diagram illustrating a statistical deviation computation methodology, according to an embodiment of the present invention.

Referring now to FIG. 3, a flow diagram illustrates a deviation computation methodology, according to an embodiment of the present invention. FIG. 3 may be considered a detailed description of block 210 in FIG. 2. The computation of the level of statistical deviations at a given instant is necessary for the abnormality signal determination phase as well as a learning model. The methodology begins at block 300. In block 310, a polynomial approximation is computed. A polynomial regression technique may be used which can compute the statistically expected value of the secondary data stream at a given moment in time. The polynomial regression function may be computed using a least squares error criterion. Thus, in block 320, a predicted value is computed from the polynomial approximation.

Consider the tick r at which the points $y_{i(1)} \ldots y_{i(r)}$ have already arrived for stream i. For each 1 in $\{1, \ldots r\}$, the technique approximates the data point $y_{i(1)}$ by a polynomial in t(1) or order k. In other words, the data point $y_{i(1)}$ is approximated by the polynomial function $f_{i(k,1)}$, where:

$$f_{i(k,1)} = \sum_{\{j=0\}}^{k} a^1_{\{ij\}} \cdot T(1)^j$$

Here, the coefficients of the polynomial function are $\alpha^1_{\{i1\}} \ldots \alpha^1_{\{ik\}}$. The values of $\alpha^1_{\{ij\}}$ need to be computed using the actual data points in order to find the best fit. Specifically, the data points within a maximum window history of $h_t$ are used in order to compute the coefficients of this polynomial function. While these coefficients can be estimated quite simply by using a polynomial fitting technique, not all points are equally important in characterizing this function. This function is used to compute the predicted value.

The predicted value is then used in order to compute the statistical deviation between the actual and predicted value, which is achieved in step 330 of FIG. 3. Data from previous abnormality occurrences are used in order to create a distinguishing model for the particular kind of abnormality which is being tracked. This model for distinguishing different kinds of abnormalities needs modeling which is done offline. The methodology terminates at block 340.

Figure 4:
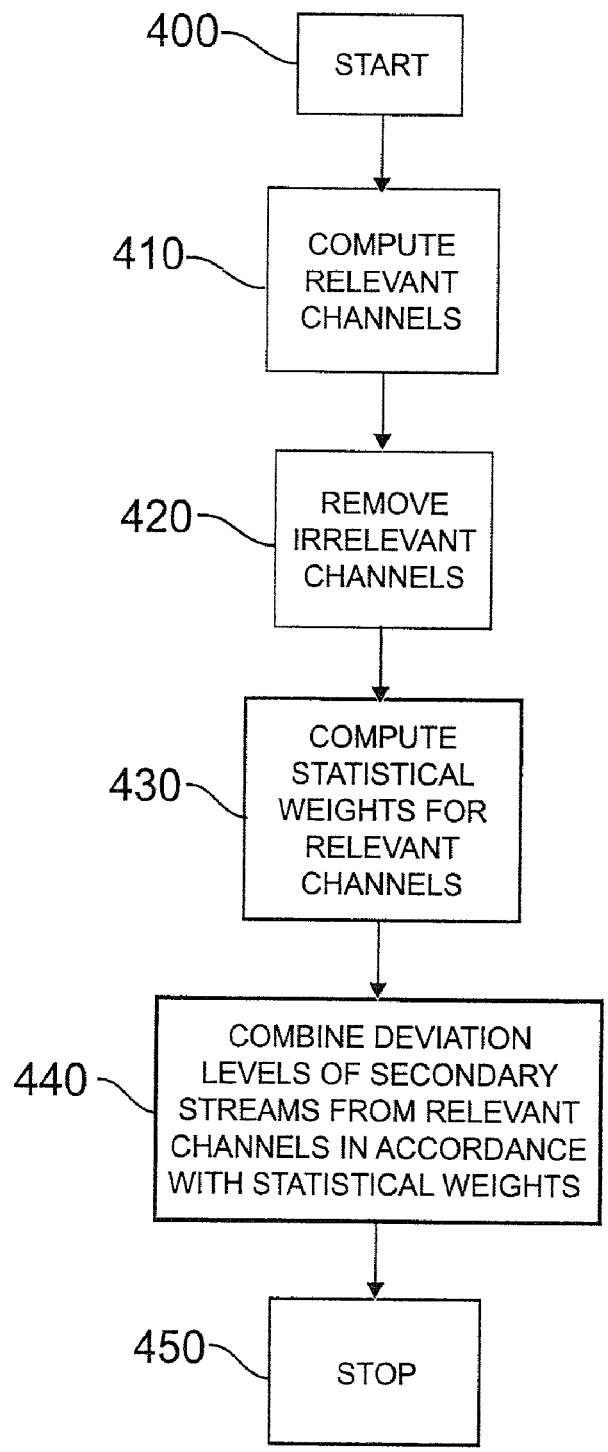
FIG. 4 is a flow diagram illustrating a deviation level combination methodology, according to an embodiment of the present invention.

Referring now to FIG. 4, a flow diagram illustrates a deviation level combination methodology for secondary data streams, according to an embodiment of the present invention. FIG. 4 may be considered a detailed description of block 220 in FIG. 2. In many cases, even when secondary data streams are similarly affected by different kinds of abnormalities, the relative magnitudes of the streams could vary considerably. It is desirable to create a function of the z-numbers of the different streams which is a "signature" of that particular kind of abnormality. In order to achieve this goal, a new signal is created at each tick, which is a linear combination of the signals from the different secondary data streams. Let $\alpha_1 \ldots \alpha_N$ be N real coefficients. The following new signal $Z(r)$ is defined in terms of the original signal and the alpha values:

$$Z(r) = \sum_{\{i=1\}}^{N} \alpha_i \ldots z_{i(r)}$$

The methodology begins at block 400. Many of the secondary data streams and their corresponding channels may be noisy and will not have any correlation with the primary abnormality. Such streams and their corresponding channels need to be discarded from the abnormality distinguishing process. In other words, the corresponding values of $\alpha_i$ need to be set to zero. The first step is to identify such channels in block 410. In block 420, the irrelevant data stream channels are removed. For each of the time stamps $T(j)$ in $\{T(1) \ldots T(s)\}$ at which an abnormality of interest has occurred, the largest value $\max_{\{ij\}}$ of $z_{i(r)}$ is found for each r such that $T(j) \leq t(r) \leq T(j) + \text{maxlag}$. A stream i is said to be interesting to the abnormality detector, when for each j in $\{1 \ldots s\}$ the value of $\max_{\{ij\}}$ is larger than a predefined threshold $z_{\{min\}}$. This subset of streams $\{i_1 \ldots i_w\}$ in $\{1 \ldots N\}$ is denoted by S.

In block 430 statistical weights are computed for each relevant channel. The statistical weights may be computed through a learning algorithm or a least squares error optimization. In block 440, the deviation levels of the secondary data streams from the relevant channels are combined in accordance with the corresponding weighted sums of the relevant channels. Once a small number of streams are selected, which are meaningful for the abnormality detection process, the value of the discrimination vector alpha is found which distinguishes the primary abnormalities from other similar abnormalities. The main idea is to choose alpha in such a way so that the value of $Z(r)$ peaks just after the occurrence of each primary abnormality to a much greater extent that any other abnormality. It is assumed that the time stamps at which all secondary abnormalities which have happened within the previous history of $h_r$, are given by $t(i_1) \ldots t(i_1)$, whereas the time stamps of the primary abnormality are given by $\{T(1) \ldots T(s)\} = \{t(j_1) \ldots t(j_s)\}$. For each secondary abnormality $i_k$ and each stream j, the maximum value of $z_{j(r)}$ is computed for each value of r, such that $t(r)$ in $(t(i_k), t(i_k) + \text{maxlag})$. Let the corresponding time stamp be given by $ts*^{(k)}_j$ for each k in $\{1 \ldots 1\}$. This time stamp is then averaged over all streams which lie in S. Therefore, for each secondary abnormality k, $Ts*^{(k)} = \Sigma_{\{i \text{ in } S\}} ts*^{(k)}_j/|S|$ is computed. Similarly, for each occurrence of the primary abnormality, the average time stamp $Tp*^{(k)}$ is computed for each k in $\{1 \ldots s\}$. In order for the discrimination between primary and secondary abnormalities to be as high as possible, the difference in the average value of the composite signal at the time stamps of the true and spurious abnormalities must be maximized. The values of alpha are chosen in such a way that the ratio of the signal at the times of the primary abnormalities to the value of the signal at the times of the secondary abnormalities is maximized.

$$ZP(r+1) = \Sigma_{\{i \text{ in } S\}} \alpha_i \cdot z_i(r+1)$$

This value is the signal which is specific to the primary abnormality. The greater this value, the higher the likelihood that a primary abnormality has indeed occurred in the stream. The methodology terminates in block 450.

A primary abnormality is predicted by using a minimum threshold on the value of $ZP(r+1)$. Whenever the value of $ZP(r+1)$ exceeds this threshold, a discrete signal is output which indicates that the abnormality has indeed occurred as shown in block 230 of FIG. 2. The use of higher thresholds on the abnormality detection signature results in lower number of false positives, but lower detection rates as well as higher lags.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

The invention claimed is:

1. A computer-implemented method for monitoring a primary data stream, comprising a plurality of secondary data streams, for abnormalities, comprising the steps of:
   determining a deviation value for each of two or more of the plurality of secondary data streams;
   combining the two or more deviation values of the two or more secondary data streams according to statistical weights associated with the secondary data streams to foam a combined deviation value; and
   generating an abnormality signal based at least in part on the combined deviation value such that a ratio of a value of the abnormality signal at times of target abnormalities to a value of the abnormality signal at times of non-target abnormalities is maximized.

2. The method of claim 1, wherein the step of determining a deviation value further comprises the steps of:
   computing a polynomial approximation;
   computing a predicted value from the polynomial approximation; and
   computing a deviation value using an actual value and the predicted value.

3. The method of claim 1, wherein, in the step of combining the two or more deviation values, the two or more secondary data streams are associated with one or more channels of the primary data stream.

4. The method of claim 3, wherein the step of combining the two or more deviation values further comprises the steps of:
   determining one or more relevant channels from the one or more channels of the primary data stream;
   computing a statistical weight for each of the one or more relevant channels; and
   combining two or more deviation values of the two or more secondary data streams associated with the one or more relevant channels in accordance with one or more corresponding statistical weights.

5. The method of claim 1, wherein, in the step of combining the two or more deviation values, the abnormality signal comprises a value relating to a likelihood of an abnormality in the primary data stream.

6. The method of claim 1, wherein the steps of determining a deviation value and combining the two or more deviation values are repeated for each point in time at which the primary data stream is monitored.

7. The method of claim 1, wherein the step of determining a deviation value for each of two or more of the plurality of secondary data streams comprises the steps of:
   determining which two or more of the plurality of secondary data streams correlate to target abnormalities; and
   determining a deviation value for each of the two or more secondary data streams determined to correlate to target abnormalities.

8. The method of claim 1, wherein each of the two or more secondary data streams comprises a set of two or more dimensions.

9. The method of claim 8, wherein the set of dimensions of at least a first one of the two or more secondary data streams differs from the set of dimensions of at least a second one of the two or more secondary data streams.

10. Apparatus for monitoring a primary data stream, comprising a plurality of secondary data streams, for abnormalities, comprising:
- a memory; and
- at least one processor coupled to the memory and operative to perform the operations of:
  - determining a deviation value for each of two or more of the plurality of secondary data streams;
  - combining the two or more deviation values of the two or more secondary data streams according to statistical weights associated with the secondary data streams to form a combined deviation value; and
  - generating an abnormality signal based at least in part on the combined deviation value such that a ratio of a value of the abnormality signal at times of target abnormalities to a value of the abnormality signal at times of non-target abnormalities is maximized.

11. The apparatus of claim 10, wherein the operation of determining a deviation value further comprises the operations of:
- computing a polynomial approximation;
- computing a predicted value from the polynomial approximation; and
- computing a deviation value using an actual value and the predicted value.

12. The apparatus of claim 10, wherein, in the operation of combining the two or more deviation values, the two or more secondary data streams are associated with one or more channels of the primary data stream.

13. The apparatus of claim 12, wherein the operation of combining the two or more deviation values further comprises the operations of:
- determining one or more relevant channels from the one or more channels of the primary data stream;
- computing a statistical weight for each of the one or more relevant channels; and
- combining two or more deviation values of the two or more secondary data streams associated with the one or more relevant channels in accordance with one or more corresponding statistical weights.

14. The apparatus of claim 10, wherein, in the operation of combining the two or more deviation values, the abnormality signal comprises a value relating to a likelihood of an abnormality in the primary data stream.

15. The apparatus of claim 10, wherein the operations of determining a deviation value and combining the two or more deviation values are repeated for each point in time at which the primary data stream is monitored.

16. The apparatus of claim 10, wherein the operation of determining a deviation value for each of two or more of the plurality of secondary data streams comprises the operations of:
- determining which two or more of the plurality of secondary data streams correlate to target abnormalities; and
- determining a deviation value for each of the two or more secondary data streams determined to correlate to target abnormalities.

17. The apparatus of claim 10, wherein each of the two or more secondary data streams comprises a set of two or more dimensions.

18. The apparatus of claim 14, wherein the set of dimensions of at least a first one of the two or more secondary data streams differs from the set of dimensions of at least a second one of the two or more secondary data streams.

19. An article of manufacture for monitoring a primary data stream, comprising a plurality of secondary data streams, for abnormalities, comprising a machine readable tangible storage medium containing one or more programs which when executed implement the steps of:
- determining a deviation value for each of two or more of the plurality of secondary data streams;
- combining the two or more deviation values of the two or more secondary data streams according to statistical weights associated with the secondary data streams to form a combined deviation value; and
- generating an abnormality signal based at least in part on the combined deviation value such that a ratio of a value of the abnormality signal at times of target abnormalities to a value of the abnormality signal at times of non-target abnormalities is maximized.

* * * * *